US006940822B1

(12) United States Patent
Herfet et al.

(10) Patent No.: US 6,940,822 B1
(45) Date of Patent: Sep. 6, 2005

(54) METHOD FOR TRANSMITTING TIME-CRITICAL DATA PACKETS IN DIGITAL WIRELESS TRANSMISSION SYSTEMS

(75) Inventors: Thorsten Herfet, Altdorf (DE); Werner Bauer-Schmidt, Langenzenn (DE)

(73) Assignee: Grundig Multimedia B.V., Amsterdam (NL)

( * ) Notice: Subject to any disclaimer, the term of this patent is extended or adjusted under 35 U.S.C. 154(b) by 0 days.

(21) Appl. No.: 09/646,734

(22) PCT Filed: Mar. 24, 1999

(86) PCT No.: PCT/EP99/02015

§ 371 (c)(1),
(2), (4) Date: Dec. 29, 2000

(87) PCT Pub. No.: WO99/51032

PCT Pub. Date: Oct. 7, 1999

(30) Foreign Application Priority Data

Mar. 27, 1998 (DE) ................................. 198 13 551

(51) Int. Cl.7 .............................. H04J 1/16; H04J 3/06
(52) U.S. Cl. ....................... 370/252; 370/474; 370/509
(58) Field of Search ............................... 370/328, 349, 370/350, 389, 382, 384, 465, 468, 508, 509, 370/516, 474, 510, 512, 252

(56) References Cited

U.S. PATENT DOCUMENTS

| 5,623,483 | A | * | 4/1997 | Agrawal et al. | 370/253 |
| 5,640,388 | A | * | 6/1997 | Woodhead et al. | 370/468 |
| 5,754,773 | A | * | 5/1998 | Ozden et al. | 709/203 |
| 5,883,924 | A | * | 3/1999 | Siu et al. | 375/226 |
| 6,031,584 | A | * | 2/2000 | Gray | 375/240.28 |
| 6,137,949 | A | * | 10/2000 | Horiguchi et al. | 386/82 |
| 6,208,643 | B1 | * | 3/2001 | Dieterich et al. | 370/389 |

* cited by examiner

Primary Examiner—Ricky Ngo
Assistant Examiner—Andy Lee
(74) Attorney, Agent, or Firm—Quarles & Brady LLP

(57) ABSTRACT

The invention relates to a method for transmitting time-critical data packets in digital wireless transmission systems. Time-critical data packets are used e.g., in the transmission of MPEG-coded signals, since information about the temporal positions of the data packets in relation to each other must be known in the MPEG decoder. The aim of the invention is to enable data packets of this type to be transmitted via a propagation time-constrained transmission link. To this end, time information relating to the temporal position of a particular data packet is tagged onto said data packet at the sender end. This time information is then used at the receiver end to re-establish the original temporal positions of the individual data packets in relation to each other.

10 Claims, 2 Drawing Sheets

METHOD FOR TRANSMITTING TIME-CRITICAL DATA PACKETS IN DIGITAL WIRELESS TRANSMISSION SYSTEMS

BACKGROUND OF THE INVENTION

The invention concerns a method for transmission of time-critical packets.

A transition from analog to digital transmission systems is now occurring in television technology. A source code method, operating according to the MPEG standard, is known in conjunction with digital transmission systems. This permits data compression, which allows particularly efficient data transmission. For example, it was possible in analog technology to transmit a television program on a satellite transponder with 33 MHz bandwidth. On the other hand, five to ten programs of the same quality can be transmitted on the same transponder with digital technology.

In the MPEG standard, the individual programs are transmitted in time multiplex in the form of data streams, which are divided into blocks or data packets. A program consists of several data streams of different type (video information, audio information, auxiliary information), the so-called elementary data streams. The elementary data streams of a program are combined in a program multiplexer to a program data stream. Several program data streams are assembled in a transport multiplexer to a transport data stream. This is transmitted to a satellite via a so-called uplink, which converts the signal and distributes it for satellite direct reception at the viewer.

The MPEG data stream is regenerated from the signals received by a satellite antenna by means of a satellite receiver or a set top box and fed to a television or video recorder connected downline. Separation of data packets pertaining to a desired television program and MPEG decoding occur there. The data packets pertaining to the desired television program are transmitted in time multiplex with data packets allocated to other programs and are therefore spaced from each other in time. In each of the data packets that are assigned to the desired program, data are contained that give information about the time of transmission of the next data packet that pertains to the desired program. This information concerning the time of transmission of the next data packet is used by the MPEG decoder to set a time window, in which the appearance of this next data packet that must be subjected to MPEG decoding is waited for. Consequently, data packets that do not belong to the desired program need not be checked and temporarily stored in the MPEG decoder. The storage capacity of the memory in the MPEG decoder must consequently be only large enough so that a complete data packet can be decoded. During transmission of MPEG-coded data packets, time-critical data packets are therefore involved, whose relative time position with respect to each other must be known during MPEG decoding.

This information concerning the time position of individual data packets of a desired radio program relative to each other, however, is lost if MPEG-coded signals are to be transmitted, for example, via a radio transmission link whose transmission bandwidth is much smaller than the bandwidth available for satellite transmission of MPEG-coded signals. Both the latency and travel time of data packets are not predictable in wireless radio transmission systems, since they are dependent on the system occupation (CSMA access) and on the transmission distance.

Starting from this prior art, the underlying task of the invention is to provide a new way, with which time-critical data packets can be transmitted over a travel time-burdened transmission link.

SUMMARY OF THE INVENTION

The advantages of the invention consist especially in the fact that, by impressing time information on the transmitter side on each of the data packets being transmitted, information is available on the receiver side that permits the individual data packets to be made available with exactly the same relative time position with respect to each other as they had on the transmitter side. Because of this, undesired travel time effects that occur on the transmission link are fully compensated, so that the data packets can be decoded in an MPEG decoder arranged on the receiver side that requires the data packets in the correct time position.

By means of the features stated in claim 2, a situation is achieved in which the time-critical data packets can also be transmitted over a transmission line with limited bandwidth.

According to claim 4, the data packets spaced from each other in time are separated from an MPEG data stream. The time intervals present between the separated data packets favor scanning rate conversion.

According to claim 7, the time-critical data packets are transmitted from a first to a second consumer electronics device. For example, in this manner, MPEG-coded signals in a private household can be transmitted from a television, to which the MPEG transport stream is fed, in wireless fashion to another consumer electronics device arranged in the same room, for example, a video recorder or radio receiver, and MPEG-decoded only there. Transmission of MPEG-coded signals from a first to a second consumer electronics device is advantageous, among other things, because MPEG-coded signals are provided with high error protection, so that high transmission security is guaranteed on the transmission link.

BRIEF DESCRIPTION OF THE DRAWING

A practical example of the invention is described below in reference to the figures in which.

In the Figures.

DETAILED DESCRIPTION

Figure 1:
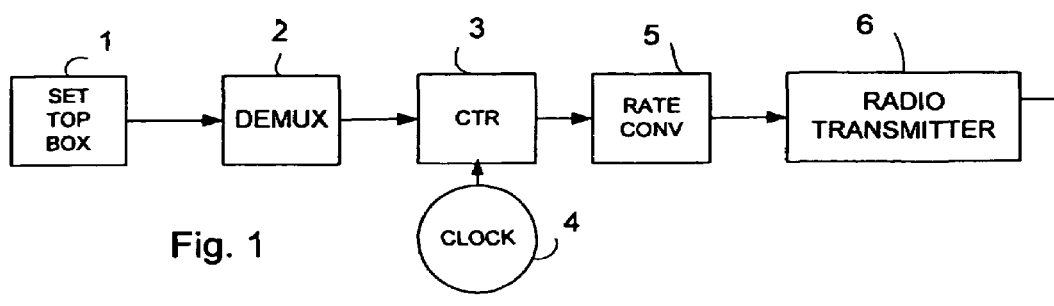
FIG. 1 shows a block diagram of a device for execution of the claimed method.

FIG. 1 shows a block diagram of the device for execution of the claimed method. The depicted device has a satellite receiver or a set top box 1, by means of which an MPEG transport stream, as emitted by a radio satellite, is regenerated and made available to a demultiplexer 2. Such an MPEG transport stream is shown in FIG. 2a and has a number of data packets that are denoted with letters A, B, C and D. The data packets designated A pertain to a television program A, the data packets designated B pertain to a television program B, the data packets designated C pertain to a television program C, and the data packets designated D pertain to a television program D. The data packets pertaining to television program B are selected from the MPEG transport stream in demultiplexer 2, which is shown in FIG. 2b.

For later MPEG decoding of these data packets, information concerning the relative time position of the individual data packets shown in FIG. 2b is necessary. To obtain such information, a system clock 4 is provided, in which a high-precision counter can be involved. This generates a high frequency timing signal, as shown in FIG. 2c. The counting value present at the beginning of each data packet B is determined in device 3 as time information for the corresponding data packet and tagged to this data packet. FIG. 2d shows the mentioned data packets, to which time information 13 has been tagged.

The data packets with the tagged time information 13 are fed to a data rate converter 5 and reduced or time-expanded in data rate. Transmission of the data packets with the tagged time information is made possible by this time expansion via a radio transmission channel, whose bandwidth is much smaller than the bandwidth available for satellite transmission of the MPEG transport stream. The data packets reduced in data rate are shown in FIG. 2e.

Figure 2:
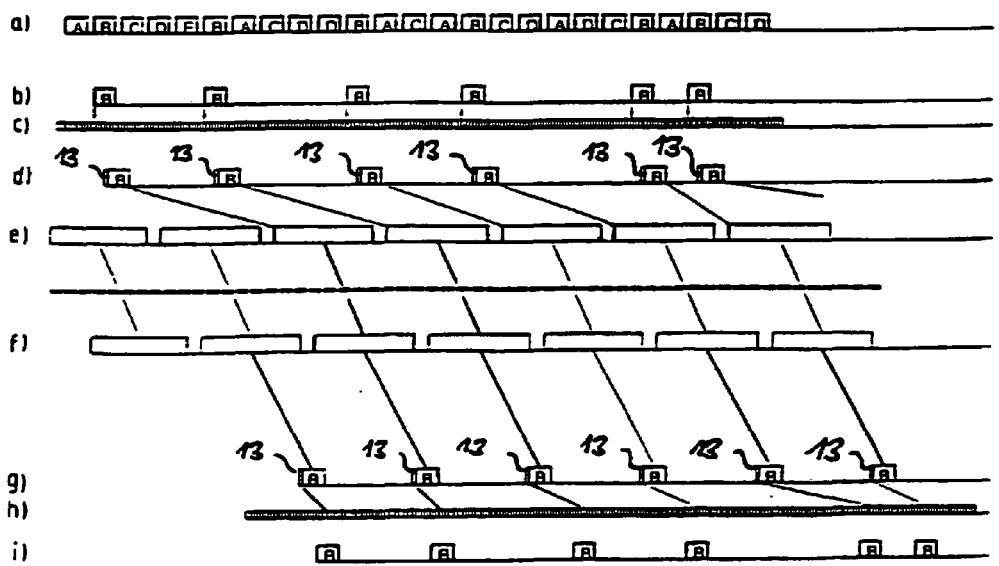
FIG. 2 shows a time diagram to explain the individual steps of a first variant of the claimed method and FIG. 3 shows a time diagram to explain the individual steps of a second variant of the claimed method.

The output signal of the data rate converter 5 is fed to a radio transmitter 6 and converted in it to a radio signal suitable for radio transmission. This radio signal is transmitted via a radio transmission link 7, which is shown in FIG. 2 with a dashed line.

The signal experiences a time delay in unknown fashion on the radio transmission link, so that the time-delayed radio signal shown in FIG. 2f arrives on the receiving side. There it enters a radio receiver 8, in which the radio signal is processed in a manner inverse to radio transmitter 6. The output signal of the radio receiver 8 is fed to a data rate converter 9 and time-compressed again there, in order to restore the original data rate of the signal. The output signal of the data rate converter is shown in FIG. 2g.

The signal raised again in data rate reaches a device 10, which is provided to separate the data packets from the transmitted signal and has an intermediate memory for the separated data packets.

A system clock 11 is also provided on the receiver side, in which a high-precision counter can again be involved. This is synchronized by the transmitted signals and provides device 10 with high-frequency timing signals, which are shown in FIG. 2h. Memory control signals to control the readout process from the memory are generated in device 10, using the timing signals delivered by the system clock 11 and the transmitted time information, so that the individual data packets are prepared with the same time spacings relative to each other as they had on the transmitter side. This is shown in FIG. 2i.

The data packets shown in FIG. 2i, in comparison with the data packets shown in FIG. 2b, do have a time lag, which is caused by the different signal processing steps shown in FIG. 1, but occur relative to each other at exactly the same time spacings as the data packets shown in FIG. 2b.

The data packets shown in FIG. 2i are fed to the MPEG decoder 12 and subjected there to MPEG decoding. The output signal of the MPEG decoder 12 is finally further processed in known fashion, for example, converted to a signal that can be displayed on the screen of a television or recorded by means of a video recorder.

The invention just described can be applied, for example, to transmit data packets separated from an MPEG transport stream, which pertain to a desired radio program, from a first consumer electronics device in wireless fashion to a second consumer electronics device. The first consumer electronics device can, like the second consumer electronics device, be a television, video recorder or a radio receiver. In the mentioned first device, the demultiplexer 2, the system clock 4, the device 3 to determine the relative time position of the individual data packets with respect to each other and to add time information to each of the data packets, the data rate converter 5 and the transmitter 6 are provided. The mentioned second device has the receiver 8, the data rate converter 9, device 10 to separate the data packets and for intermediate storage of the separated data packets, system clock 11, the device provided with time information to control the readout process and the MPEG decoder 12.

Figure 3:
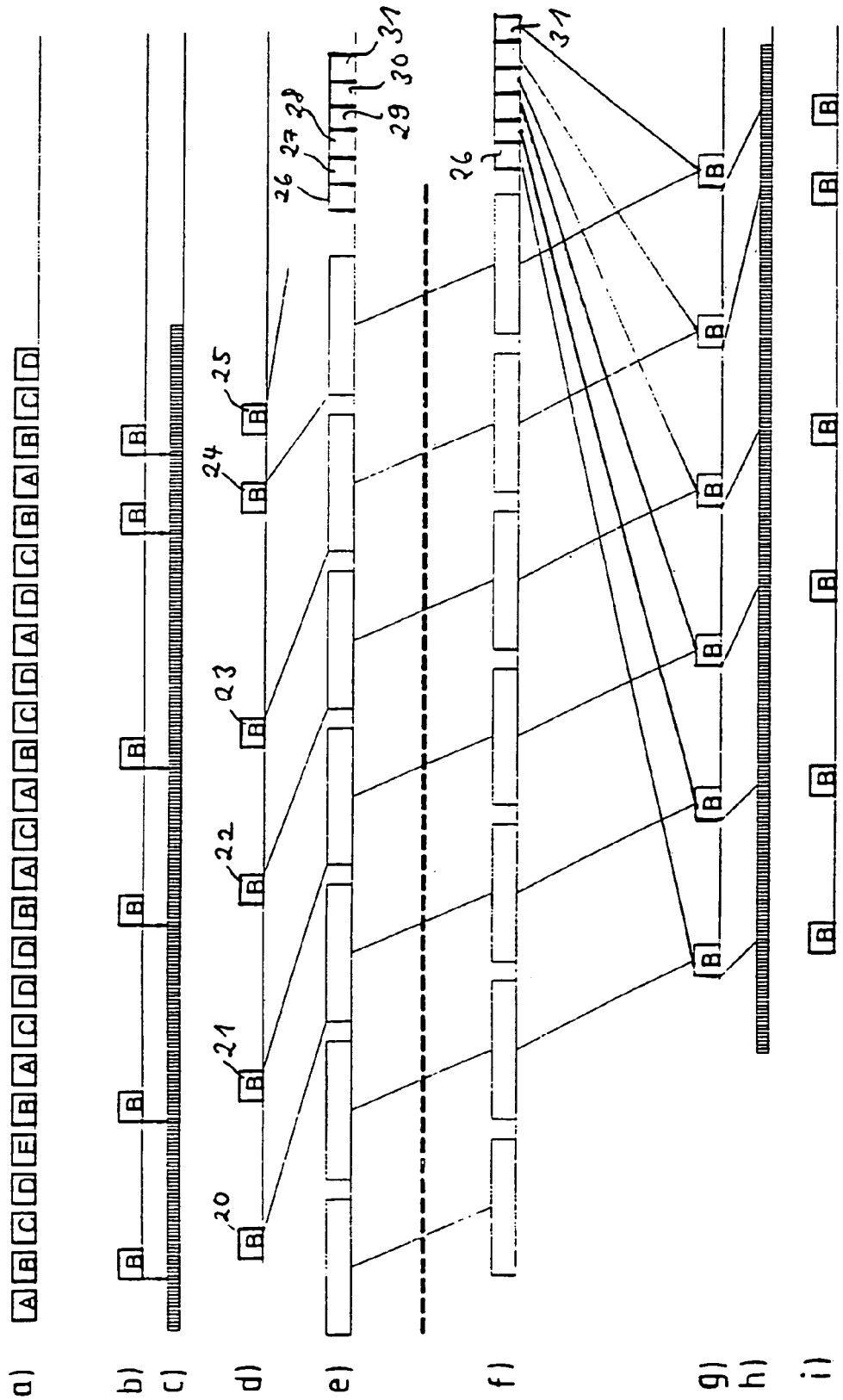

FIG. 3 shows another practical example for transmission of data packets A, B, C, D of an MPEG transport stream, in which the time information for the individual data packets is transmitted as separate common time information blocks 26, 27, 28, 29, 30, 31 for individual data blocks 20, 21, 22, 23, 24, 25. Otherwise, the procedure for generation and recovery of the time information corresponds essentially to the procedure already described in conjunction with FIGS. 1 and 2. Thus, the data packets pertaining to television program B are selected from the MPEG transport stream in demultiplexer 2 (cf. FIG. 1), which is shown in FIG. 3b. For later MPEG decoding of these data packets, information concerning the relative time position of the individual data packets shown in FIG. 3b is required. To obtain such information, a system clock 4 (FIG. 1) is again provided, which generates a high-frequency timing signal, as shown in FIG. 3c. The counting value present at the beginning of each data packet B is determined in device 3 as time information for the corresponding data packet and arranged as time information 26 in data packets 26, . . . 31. FIG. 3e shows the mentioned data packets 20, . . . 25, each of which is followed by a time information data blocks 26, . . . 31. This time information data blocks 26, . . . 31 contain the time information for data packets 20, . . . 25. As already explained in conjunction with FIGS. 1 and 2, the data packets 20, . . . 25 with the following time information blocks 26, . . . 31 are reduced or time-expanded in data rate. By this time expansion, transmission of the data packets with time information is made possible over a radio transmission channel, whose bandwidth is much smaller than the bandwidth available for satellite transmission of the MPEG transport stream. The data packets reduced in data rate are shown in FIG. 3e. Transmission via a radio transmission channel is again shown with a dashed line in FIG. 2.

The signal undergoes a time delay in unknown fashion on the radio transmission link, so that the time-delayed radio signal shown in FIG. 3f arrives on the receiver side. On the receiver side, it is fed to a data rate converter 9 and time-compressed there again, in order to restore the original data rate of the signal. The output signal of the data rate converter is shown in FIG. 3g. A system clock 11 is again provided on the receiver side. This is synchronized by the transmitted signals and provides device 10 with a high-frequency timing signal, which is shown in FIG. 3h. Memory control signals to control the readout process from the memory are generated in device 10, using the timing signals delivered by system clock 11 and the transmitted time information 26, . . . 31, so that the individual data packets are produced with the same time spacing relative to each other as they had on the transmitter side. This is shown in FIG. 3i. The data packets shown in FIG. 3i, in comparison with the data packets shown in FIG. 3b, do have a time delay, which is caused by the different signal processing steps shown in FIG. 1, but occur relative to each other in exactly the same time spacings as the data packets shown in FIG. 3b.

The invention just described is applicable, for example, in order to transmit data packets separated from an MPEG transport stream that pertain to a desired radio program from a first consumer electronics device in wireless fashion to a second consumer electronics device. The first consumer electronics device, like the second consumer electronics device, can be a television, a video recorder or a radio receiver. In the mentioned first device, the demultiplexer 2, the system clock 4, the device 3 for determination of the relative time position of the individual data packets with respect to each other and to add time information to each of the data packets, the data rate converter 5 and the transmitter 6 are provided. The mentioned second device has the receiver 8, the data rate converter 9, the device 10 for separation of the data packets and for intermediate storage of the separated data packets, the system clock 11, the device provided with time information to control the readout process and the MPEG decoder 12.

After all this, a common time basis is created for the mentioned transmission by means of the invention, based on which the relative time ratios of the individual data packets present on the transmitter side can be reproduced in the receiver. This is an essential prerequisite for being able to use an ordinary MPEG decoder on the receiver side, which, because of its limited storage capabilities, imposes critical time requirements on the data packets fed to it.

What is claimed is:

1. Method for transmission of time-critical data packets comprising the following method steps:
   providing at the transmitter end data packets from different streams of data spaced apart from each other in time,
   determining a relative time position of individual data packets with respect to each other using a system clock,
   determining a time information item for each data packet,
   combining a multiplicity of time information items of previous data packets to form a separate data packet,
   transmitting the data packets via a wireless transmission link,
   transmitting the separate data packet with the time information items over the wireless transmission link,
   separating at the receiving end and temporary storage of the data packets in at least one of the two different streams of data and of the separate data packet at the receiving end,
   synchronizing a further system clock disposed at the receiving end by means of the transmitted time information items,
   reassembling the individual data packets in said at least one of the two different streams of data in the same time intervals with respect to one another in which they were present at the transmitter end by a controlled read-out of the temporary memory within a time-critical period using the separately transmitted time information items in the separate data packet.

2. Method according to claim 1, characterized in that the data packets are subjected at the transmitter end to a data rate conversion and at the receiving end to a data rate conversion.

3. Method according to claim 2, characterized in that the transmitter-end provision of the data packets spaced apart in time from one another takes place by separation of the data packets from an MPEG transport stream.

4. Method according to one of the any of claims 1 to 3, characterized in that the data packets are associated with at least two broadcast programs transmitted in the MPEG transport stream.

5. Method according to claim 4, characterized in that the data packets are associated with a television program and a sound broadcast program, respectively.

6. Method according to claim 4, characterized in that the transmission of the time critical data packets takes place from a first entertainment electronics appliance to a second entertainment electronics appliance.

7. Method according to claim 4, characterized in that the MPEG transport stream is made available by a satellite receiver or a set-top box.

8. Entertainment electronics appliance comprising:
   a demultiplexer (2) for separation of data packets pertaining to a broadcast program from an MPEG transport stream,
   means for providing the separated data packets in data packets spaced apart from one another in time,
   a system clock (4),
   a device connected to the system clock (4), for determining the relative time position of the individual data packets with respect to one another,
   a device for adding a time information item to the data packets and for arranging the time information associated with the respective data packet in the respective data packet,
   means for combining a multiplicity of time information items of previous data packets to form a separate time information block,
   a transmitter (6) for transmitting the data packets provided with the time information items and the separate time information blocks.

9. Device according to claim 8, characterized in that it furthermore has a data rate converter (5).

10. Entertainment electronics appliance comprising:
    a receiver (8) for receiving data packets provided with time information items and for receiving a separate time information block comprising combined time information items of preceding data packets,
    means for separating the data packets provided with time information items and the time information blocks,
    a memory (10) for the temporary storage of the separated data packets and of the time information blocks,
    a system clock (11),
    means for synchronizing the system clock (11) on the basis of the received time information items of the data packets, and
    a device (10) for controlling the read-out operation of the temporally stored data packets from the memory (10) by means of the time information items of the time information blocks temporarily stored in the memory (10) in such a way that the individual data packets are produced provided in the same intervals with respect to each other as they were present at the transmitter end.

* * * * *

UNITED STATES PATENT AND TRADEMARK OFFICE
CERTIFICATE OF CORRECTION

PATENT NO. : 6,940,822 B1
APPLICATION NO. : 09/646734
DATED : September 6, 2005
INVENTOR(S) : Thorsten Herfet and Bauer-Schmidt It is certified that error appears in the above-identified patent and that said Letters Patent is hereby corrected as shown below:

<u>Column 6,</u>
Line 1, "to one of the any" should be -- to any --.
Line 57, "produced provided" should be -- provided --.

Signed and Sealed this

Fourth Day of July, 2006

JON W. DUDAS
*Director of the United States Patent and Trademark Office*